US012340573B2

(12) United States Patent
Krönke et al.

(10) Patent No.: US 12,340,573 B2
(45) Date of Patent: Jun. 24, 2025

(54) PROBABILISTIC REGULARIZATION OF CONVOLUTIONAL NEURAL NETWORKS FOR MULTIPLE-FEATURE DETECTION BASED ON CORRELATIONS

(71) Applicant: KONINKLIJKE PHILIPS N.V., Eindhoven (NL)

(72) Inventors: Sven Krönke, Hamburg (DE); Daniel Bystrov, Hamburg (DE); Jens Von Berg, Hamburg (DE); Stewart Matthew Young, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 414 days.

(21) Appl. No.: 17/777,172

(22) PCT Filed: Nov. 17, 2020

(86) PCT No.: PCT/EP2020/082429
§ 371 (c)(1),
(2) Date: May 16, 2022

(87) PCT Pub. No.: WO2021/104946
PCT Pub. Date: Jun. 3, 2021

(65) Prior Publication Data
US 2022/0406047 A1    Dec. 22, 2022

(30) Foreign Application Priority Data
Nov. 26, 2019   (EP) ...................................... 19211465

(51) Int. Cl.
G06V 10/77   (2022.01)
G06V 10/62   (2022.01)
G06V 10/82   (2022.01)

(52) U.S. Cl.
CPC .............. *G06V 10/82* (2022.01); *G06V 10/62* (2022.01); *G06V 10/7715* (2022.01); *G06V 2201/03* (2022.01)

(58) Field of Classification Search
CPC .... G06V 10/82; G06V 10/62; G06V 10/7715; G06V 2201/03
See application file for complete search history.

(56) References Cited

U.S. PATENT DOCUMENTS

2018/0116620 A1   5/2018   Chen
2019/0205606 A1   7/2019   Zhou
(Continued)

FOREIGN PATENT DOCUMENTS

WO   WO2018060106 A1   4/2018

OTHER PUBLICATIONS

PCT International Search Report, International application No. PCT/EP2020/082429, Feb. 11, 2021.
(Continued)

*Primary Examiner* — Juan M Guillermety
(74) *Attorney, Agent, or Firm* — Larry Liberchuk

(57) ABSTRACT

The present invention relates to landmark and/or temporal event detection. It is proposed to utilize previously learned spatial statistical correlations between multiple landmarks in order to regularize convolutional neural networks (CNNs) either as a post-processing step or during training in order to utilize anatomical prior knowledge, reduce the false-positive prediction rate, and/or increase the accuracy and stability of the algorithm. The proposed apparatus and method may also be applied to improve the detection of correlated events in e.g., time-series by leveraging prior knowledge.

14 Claims, 5 Drawing Sheets

(56) References Cited

U.S. PATENT DOCUMENTS

2019/0259493 A1    8/2019  Ku
2020/0125877 A1*   4/2020  Phan .................. G06N 7/01

OTHER PUBLICATIONS

Payer C. et al., "Regressing Heatmaps for Multiple Landmark Localization Using CNNs", Oct. 2, 2016 (Oct. 2, 2016), International Conference on Financial Cryptography and Data Security; [Lecture Notes in Computer Science; Lect.Notes Computer], Springer, Berlin, Heidelberg, pp. 230-238, XP047392503.

Afshar P. et al., "From Hand-Crafted to Deep Learning-based Cancer Radiomics: Challenges and Opportunities", arxiv.org, Cornell University Library, 201 Olin Library Cornell University Ithaca, NY 14853, Aug. 23, 2018 (Aug. 23, 2018), XP081019405.

Wang X. et al., "Joint Segmentation and Landmark Localization of Fetal Femur in Ultrasound Volumes", 2019 IEEE EMBS International Conference on Biomedical & Health Informatics (BHI), IEEE, May 19, 2019 (May 19, 2019), pp. 1-5, XP033614278.

Sharma M. et al., "Effect of Various Regularizers on Model Complexities of Neural Networks in Presence of Input Noise", arXiv:1901.11458v1 [cs.LG], Jan. 31, 2019.

Carmichael J H E et al., "European Guidelines on Quality Criteria for Diagnostic Radiographic Images", Office for Official Publications of the European Communities, (EuropGuideline), 1996.

Mader A.O. et al., "Localization and Labeling of Posterior Ribs in Chest Radiographs Using a CRF-Regularized FCN with Local", Medical Image Computing and Computer Assisted Intervention—MICCAI, pp. 562-570, 2018.

* cited by examiner

PROBABILISTIC REGULARIZATION OF CONVOLUTIONAL NEURAL NETWORKS FOR MULTIPLE-FEATURE DETECTION BASED ON CORRELATIONS

FIELD OF THE INVENTION

The present invention relates to multiple-feature detection. In particular, the present invention relates to an apparatus for feature identification in medical images, a medical imaging system, a method for feature identification in medical images, and a computer program element.

BACKGROUND OF THE INVENTION

Convolutional neural networks (CNNs) have been used for anatomical landmark detection in medical images by predicting heatmaps for landmark positions. An example of using CNNs for anatomical landmark detection can be found in US 2018/0116620 A1. However, the heatmaps may lead to false-positive predictions such that the CNN raw results have to be post-processed.

SUMMARY OF THE INVENTION

There may be a need to improve feature detection in medical images.

The object of the present invention is solved by the subject-matter of the independent claims, wherein further embodiments are incorporated in the dependent claims. It should be noted that the following described aspects of the invention apply also for the apparatus, the medical imaging system, the method, and the computer program element.

Towards this end, a first aspect of the present invention provides an apparatus for feature identification in medical images. The apparatus comprises an input unit, a processing unit, and an output unit. The input unit is configured for receiving at least one medical image of an object, wherein the at least one medical image comprises a multidimensional image. The processing unit is configured for i) generating feature heatmaps for at least two features of interest by applying a convolutional neural network (CNN) to the at least one medical image, wherein the CNN has been trained for feature identification, ii) using a correlation between the at least two features of interest as a probabilistic prior for mutually regularizing the feature heatmaps, wherein the statistical correlation is estimated based on annotated medical image data, and iii) identifying the at least two features of interest in the at least one medical image based on the regularized feature heatmaps. The output unit is configured for outputting a result of the feature identification.

In other words, it is proposed to utilize previously learned correlations between multiple features of interest, i.e. statistical correlation, in order to regularize CNNS either as a post-processing step or during training in order to utilize prior knowledge, reduce the false-positive prediction rate, and/or increase the accuracy and stability of the algorithm. The features of interest may include landmarks (e.g. points, voxels, contours, surfaces, and/or volumes) and/or temporal events (temporal activity of points, voxels, contours, surfaces, and/or volumes). The statistical correlations (e.g., spatial and/or temporal correlations) between multiple features are learned previously from annotated medical image data, e.g., training data.

The statistical correlations between spatial landmarks refers to statistically properties derived from at least two landmarks on the training data. Such properties can involve the conditional probability to detect first landmark at a first position, given that a second landmark is detected at a second position. For efficient computations, this conditional probability may be approximated by the probability density of the relative vector between the positions of the first and second landmark. A corresponding definition holds for the case of temporal events. The statistical correlations between spatial landmarks will be explained hereafter and in particular with respect to the example illustrated in FIGS. 3A-3D.

The proposed apparatus may be applied to all landmark detection applications based on CNN heatmap predictions and involving at least two landmarks. For example, the proposed apparatus may be used for improving the detection of the medial clavicle ends in chest x-ray images in order to estimate the patient rotation about the head-feet axis for assessing and controlling the image quality. While the absolute positions of the medial clavicle ends varies significantly from image to image, their relative distance may be anatomically constrained. The proposed apparatus may allow for incorporating this anatomical knowledge into the clavicle-head detector for improving its accuracy and robustness. Despite of being explicated for landmark detection in images below, the proposed apparatus may also be applied to improve the detection of correlated events in e.g. time-series by leveraging prior knowledge.

According to an embodiment of the present invention, the at least two features of interest comprise at least two landmarks. The feature heatmaps comprise landmark heatmaps for the at least two landmarks generated by applying a first CNN to the at least one medical image. The first CNN has been trained for landmark identification. The statistical correlation comprises a spatial correlation between the at least two landmarks as a first probabilistic prior for mutually regularizing the landmark heatmaps. The regularized landmark heatmaps comprise regularized landmark heatmaps.

Examples of the landmarks may include points, voxels, contours, surfaces, and/or volumes in the medical images. In some examples, the landmarks may comprise anatomic features, such as a fold, prominence, duct, vessel, etc.

According to an embodiment of the present invention, the processing unit is configured for estimating the spatial correlation between the at least two landmarks in terms of a conditional probability for detecting one landmark at a certain spatial position given that another landmark has been detected at some spatial position.

The representation of the conditional probability may allow for formulating the application of this probabilistic prior as a convolution, which may as such be easily integrated into existing CNN architectures.

For example, these spatial correlations may be measured in terms of the conditional probability of finding the i-th landmark at position $x_i$, given that the j-th landmark has been found at position $x_j$:

$$p_{i|j}(x_i|x_j)$$

Given the heatmap result for the j-th landmark $q_j(x_j)$, one can estimate a prediction for the heatmap of the i-th landmark as:

$$q_{i|j}^{prior}(x_i) = \int dx_j p_{i|j}(x_i|x_j) q_j(x_j)$$

which serves as a prior for the heatmap of the i-th landmark $q_i(x_i)$.

Optionally, while the conditional probability is a 2n-dimensional object (n denoting the image dimension, i.e. n=2, 3) and as such hard to estimate, translation invariance of these binary correlations may be assumed, i.e.

$$p_{i|j}(x_i+d|x_j+d) = p_{i|j}(x_i|x_j)$$

for all spatial displacements d, from which follows:

$$p_{i|j}(x_i|x_j) = p_{j-1}^{rel}(x_j - x_i)$$

where the right-hand-side denotes the probability distribution of the relative vector between the j-th and the i-th landmarks. Being only a n-dimensional entity, the latter may be easily estimated from training data. This will be explained hereafter and particularly with respect to the exemplary embodiments in FIG. 3A to 3D.

According to an embodiment of the present invention, the processing unit is configured for estimating the spatial correlation between one landmark and more than two other landmarks in terms of a product of conditional probabilities, each for detecting the said one landmark at a certain spatial position given that one of the more than two other landmarks has been detected at some spatial position.

For example, in order to impose mutual priors for detecting more than two landmarks, the spatial correlation may be determined based on approximating the spatial correlations between the i-th landmark and N other ones, namely the $j_1$-th, ..., $j_N$-th landmark (e.g. its N anatomically nearest neighbours), by a decomposition into binary correlations:

$$p_{i|j_1...j_N}(x_i|x_{j_1},...,x_{j_N}) \approx p_{i|j_1}(x_i|x_{j_1}) \cdots p_{i|j_N}(x_i|x_{j_N})$$

where each factor on the right-hand-side can be estimated by the probability density of the corresponding relative coordinate. Thereby, the proposed approach may avoid the curse of dimensionality when estimating and evaluating these correlations. This results into the following prior for the heatmap of the i-th landmark being induced by the heatmaps for the $j_1$-th, ..., $j_N$-th landmark:

$$q_{i|j_1...j_N}^{prior}(x_i) = q_{i|j_1}^{prior}(x_i) \cdots q_{i|j_N}^{prior}(x_i)$$

According to an embodiment of the present invention, the processing unit is configured for estimating the first probabilistic prior for one landmark by convolving the conditional probability of the said one landmark at the certain spatial position and a heatmap result of another landmark indicative of a pseudo-probability for an occurrence of the said another landmark at one or more spatial positions.

According to an embodiment of the present invention, the at least two features of interest comprise at least two temporal events. The landmark heatmaps comprise temporal-event heatmaps for the at least two temporal events generated by applying a second CNN to the at least one medical image. The second CNN has been trained for temporal event identification. The statistical correlation comprises a temporal correlation between at least two temporal events to be detected as a second probabilistic prior for mutually regularizing the temporal event heatmaps. The regularized landmark heatmaps comprise regularized temporal event heatmaps.

In other words, it is also proposed to improve the detection of correlated events in e.g. time-series by leveraging prior knowledge.

Examples of the temporal event may include temporal activity of points, voxels, contours, surfaces, and/or volumes. In some examples, the temporal event may comprise the temporal activity of one or more anatomic features. The temporal activity may include intensity changes, geometry changes, and/or movement of points, voxels, contours, surfaces, and/or volumes.

For example, in a functional magnetic resonance imaging (fMRI) setting, where one is interested at the activity in a voxel after one or more stimuli, e.g., with a certain drug dose. In this case, the fMRI signal effectively constitutes a multi-dimensional (due to the spatial dimensions) time series. In such a setting, it is possible to predict e.g., the time after a stimulus at which two or more activation pattern occur, e.g., start of increasing of the activity and the start of its decay, by using CNN in the temporal dimension. Having learned the temporal correlation between two or more such events, it is possible to deduce a prior and regularize the CNN predictions. This may be particularly useful if the receptive field of the CNN, i.e. the time span of the past considered for predicting the future, is too low for properly capturing correlations between two events occurring with a lag larger than this receptive field.

According to an embodiment of the present invention, the processing unit is configured for estimating the temporal correlation between the at least two temporal events in terms of a conditional probability for detecting one temporal event at a certain temporal position given that another temporal event has been detected at some temporal position.

Similar to the landmark detection setting, the representation of the conditional probability may allow for formulating the application of this probabilistic prior as a convolution with a fixed kernel, which may as such be easily integrated into existing CNN architectures.

Similar to the landmark detection setting, these temporal correlations may be measured in terms of the conditional probability of finding the i-th temporal event at temporal position $x_i$, given that the j-th temporal event has been found at temporal position $x_j$:

$$p_{i|j}(x_i|x_j)$$

Given the heatmap result for the j-th temporal event $q_j(x_j)$, one can estimate a prediction for the heatmap of the i-th temporal event as:

$$q_{i|j}^{prior}(x_i) = \int dx_j p_{i|j}(x_i|x_j) q_j(x_j)$$

which serves as a prior for the heatmap of the i-th temporal event $q_i(x_i)$.

According to an embodiment of the present invention, the processing unit is configured for estimating the temporal correlation between one temporal event and more than two other temporal events in terms of a product of conditional probabilities, each for detecting the said one temporal event at a certain temporal position given that one of the more than two other temporal events has been detected at some temporal position.

Similar to the landmark detection setting, the temporal correlation may be determined based on approximating the temporal correlations between the i-th temporal event and N other ones, namely the $j_1$-th, ..., $j_N$-th temporal event (e.g. its N temporal nearest neighbours), by a decomposition into binary correlations:

$$p_{i|j_1...j_N}(x_i|x_{j_1},...,x_{j_N}) \approx p_{i|j_1}(x_i|x_{j_1}) \cdots p_{i|j_N}(x_i|x_{j_N})$$

where each factor on the right-hand-side coincides with the probability density of the corresponding relative coordinate. Thereby, this approach may avoid the curse of dimensionality when estimating and evaluating these temporal correlations. This results into the following prior for the heatmap of the i-th temporal event being induced by the heatmaps for the $j_1$-th, ..., $j_N$-th temporal event:

$$q_{i|j_1...j_N}^{prior}(x_i) = q_{i|j_1}^{prior}(x_i) \cdots q_{i|j_N}^{prior}(x_i)$$

According to an embodiment of the present invention, the processing unit is configured for estimating the second probabilistic prior for one temporal event by convolving the conditional probability of the said one temporal event at the certain temporal position and a heatmap result of another temporal event indicative of a pseudo-probability for an occurrence of the said another temporal event at one or more temporal positions.

According to an embodiment of the present invention, the processing unit is configured to determine the statistical correlation from training data based on a kernel density estimation approach for the relative vector between any pair of two features of interest.

According to an embodiment of the present invention, a calculation of the probabilistic prior is formulated as an additional convolutional layer of the CNN.

For example, the calculation of the probabilistic prior is formulated as the additional convolutional layer of the CNN with fixed weights.

In this way, the probabilistic regulation scheme may be integrated into all existing CNN architecture by appending convolutional layers. This may enable two variants of applying the regularization layers: either only at test time, i.e. as a post-processing step, or already during training of the CNN in order to stabilize the prediction by learning correlation-related features.

According to an embodiment of the present invention, the probabilistic prior is used to mutually regularizing the landmark heatmaps in at least one of the following manners: applying a regularization layer at test-time during a post-processing step, and applying a regularization layer during training of the CNN.

In other words, the construction of a probabilistic prior can be used to improve the predicted heatmaps either during training (as fixed term) or as a post-processing step.

Once these statistical correlations are estimated from training data, they may be kept fixed and thereby keep their interpretation even if the regularization layer is used during training. This framework may allow to approximately incorporating statistical correlations between the landmark of interest and more than two other landmarks due to the factorization approximation of these correlations.

A second aspect of the present invention provides a medical imaging system, which comprises a medical imaging apparatus and an apparatus as described above and below. The medical imaging apparatus is configured for acquiring at least one medical image of a patient. The apparatus is configured for identifying the at least two landmarks of interest in the at least one medical image.

The medical imaging apparatus may comprise at least one of: a magnetic resonance imaging (MRI) apparatus, a computer tomography (CT) imaging apparatus, an ultrasound imaging apparatus, an optical imaging apparatus, a positron-emission tomography (PET) imaging apparatus, and a single-photon emission computed tomography (SPECT) imaging apparatus.

A third aspect of the present invention provides a method for landmark identification in medical images. The method comprises:

receiving at least one medical image of an object, wherein the at least one medical image comprises a multidimensional image;

generating feature heatmaps for at least two features of interest by applying a convolutional neural network, CNN, to the at least one medical image, wherein the CNN has been trained for feature identification;

using a statistical correlation between the at least two features of interest as a probabilistic prior for mutually regularizing the feature heatmaps, wherein the statistical correlation is estimated based on annotated medical image data; and identifying the at least two features of interest in the at least one medical image based on the regularized feature heatmaps.

According to another aspect of the present invention, a computer program element is provided for controlling an apparatus as described above and below, which, when being executed by a processing unit, is adapted to perform the method steps as described above and below.

As used herein, the term "object" may include e.g., a patient, a human subject, and an animal subject.

As used herein, the term "feature" may refer to a spatial and/or temporal feature. Examples of the features of interest may include a landmark and a temporal event. The term "landmark" may refer to points, voxels, contours, surfaces, and/or volumes in the medical images. In some examples, the landmark may refer to anatomic features, such as a fold, prominence, duct, vessel, etc., which may consistently present in a tissue that serves to indicate a specific structure or position. The term "temporal event" may refer to the temporal activity of points, voxels, contours, surfaces, and/or volumes e.g., after one or more stimuli. The temporal activity may include movement, intensity changes, and/or geometry changes of the points, voxels, contours, surfaces, and/or volumes over time. In some examples, the temporal event may comprise the temporal activity of one or more anatomic features.

As used herein, the term "unit" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry" as used herein may comprise, for example, singly or in any combination, hardwired circuitry, programmable circuitry such as computer processors comprising one or more individual instruction processing cores, state machine circuitry, and/or firmware that stores instructions executed by programmable circuitry. The unit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

As used herein, the term "apparatus" may refer to an IC, an ASIC, a SoC, a desktop computer, a laptop computer, a tablet computer, a server, a smart phone, etc.

Furthermore, the terms first, second, third and the like in the description and in the claims, are used for distinguishing between similar elements and not necessarily for describing a sequential or chronological order. It is to be understood that the terms so used are interchangeable under appropriate circumstances.

These and other aspects of the present invention will become apparent from and be elucidated with reference to the embodiments described hereinafter.

BRIEF DESCRIPTION OF THE DRAWINGS

These and other aspects of the invention will be apparent from and elucidated further with reference to the embodiments described by way of examples in the following description and with reference to the accompanying drawings, in which FIG. 1 schematically illustrates an example of a network architecture for estimating heatmaps for the occurrence of the landmarks of interest.

Figure 1:
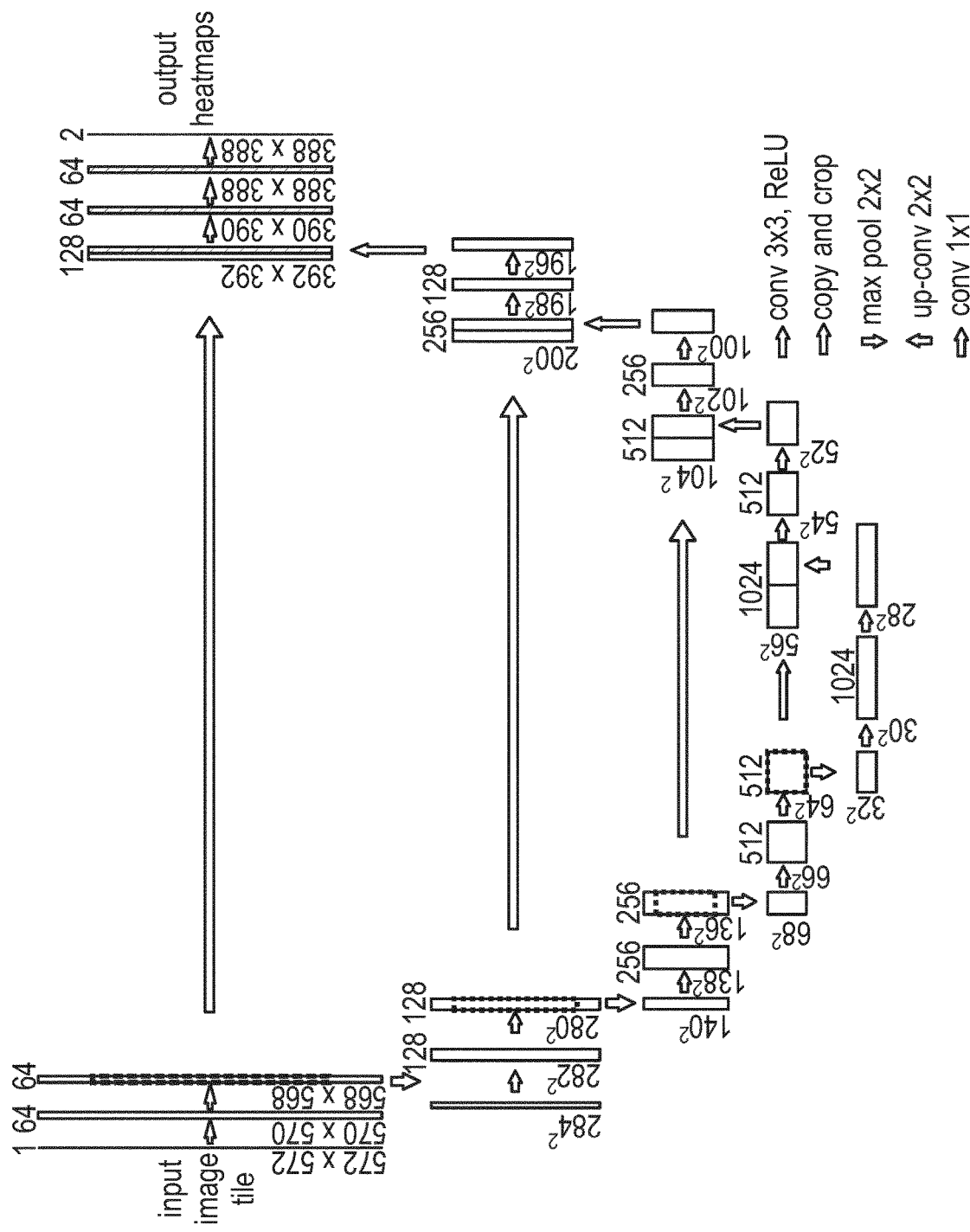

It should be noted that the figures are purely diagrammatic and not drawn to scale. In the figures, elements which correspond to elements already described may have the same reference numerals. Examples, embodiments or optional features, whether indicated as non-limiting or not, are not to be understood as limiting the invention as claimed.

DETAILED DESCRIPTION OF EMBODIMENTS

Feature detection, such as landmark detection, is an important task in the field of medical imaging, allowing for various applications such as region-of-interest cropping, image registration, measurement of biomarkers, model-based segmentation and image-quality assessment. With the advent of deep learning, convolutional neural networks (CNNs) have been applied to landmark detection.

Besides directly regressing the spatial coordinates of the landmarks of interest, estimating heatmaps, i.e. pseudo-probabilities, for the occurrence of the landmarks on the whole image via CNNs have shown to be a promising approach. This is due to the achieved detection accuracy as well as due to the fact that the resulting heatmaps allow for gaining insights into the "reasoning" of deep CNNs and thereby assisting the comprehension of such algorithms. In this approach, the landmark coordinates are estimated from the inferred heatmaps, e.g., by the argmax operation.

FIG. 1 illustrates an example of a network architecture for estimating heatmaps for the occurrence of the landmarks of interest, where one or more medical images are regarded as the input and heatmaps for the occurrence of the landmarks of interest are used as the output. The exemplary network architecture may be a fully convolutional network (FCN), such as the U-Net in FIG. 1 as an example. The network architecture comprises a contracting path (left side) and an expansive path (right side). The contracting path follows the typical architecture of a convolutional network. It comprises the repeated application of two 3×3 convolutions (unpadded convolutions), each followed by a rectified linear unit (ReLU) and a 2×2 max pooling operation with stride for downsampling. At each downsampling step the number of channels is doubled. Every step in the expansive path consists of an upsampling of the heatmaps followed by a 2×2 convolution ("up-convolution") that halves the number of channels, a concatenation with the correspondingly cropped heatmaps from the contracting path, and two 3×3 convolutions, each followed by a ReLU. Finally, the probability map of landmark locations, i.e. the heatmaps, can be estimated with the trained model.

In practice, however, heatmap-based landmark detection might be prone to false-positive predictions since the CNNs might respond to image intensity structures of different anatomies that are similar to the image intensity structure in the vicinity of the target landmark.

Figure 2:
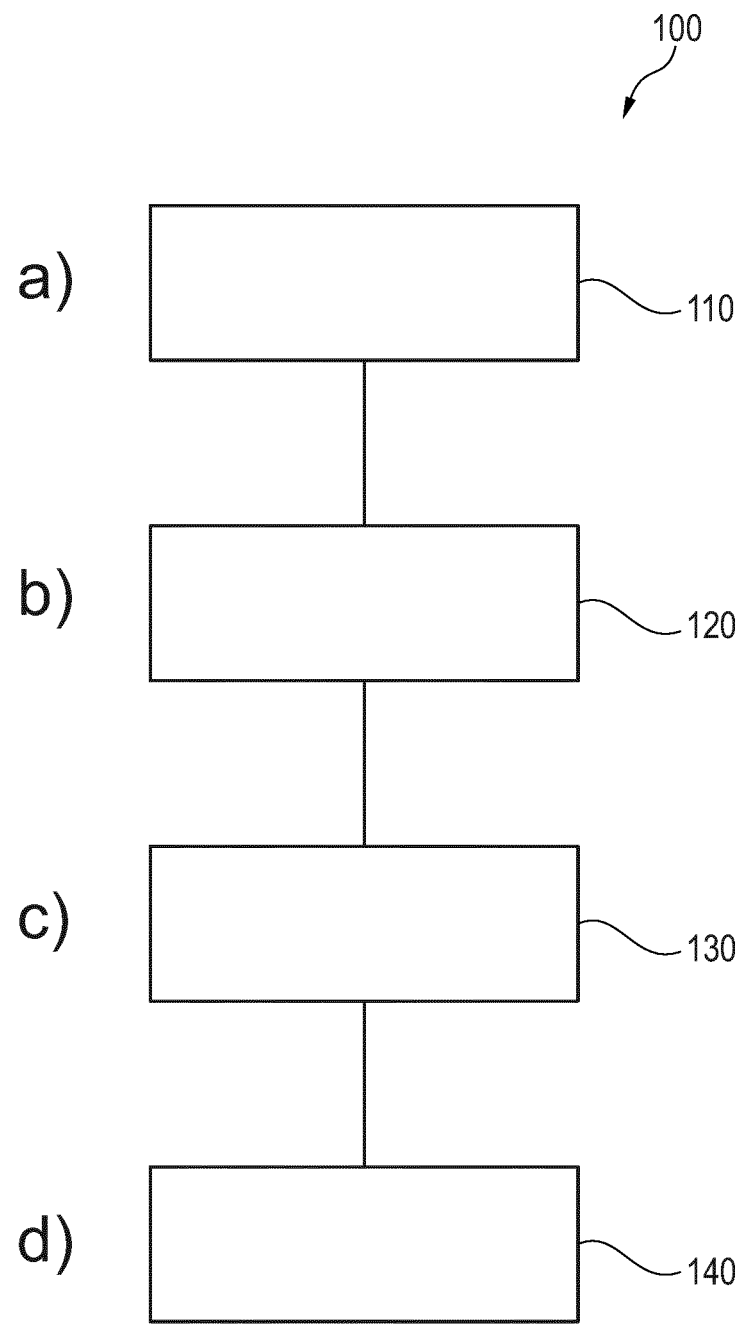
FIG. 2 illustrates a flow diagram of a method of for feature detection according to some embodiments of the present disclosure

To solve this problem, FIG. 2 illustrates a flow diagram of a method 100 of for feature detection according to some embodiments of the present disclosure. In step 110, i.e. step a), at least one medical image of an object (e.g., a patient or an animal) is received e.g., from a medical imaging apparatus, such as an ultrasound imaging apparatus, or from a picture archiving and communication system (PACS). The at least one medical image comprises a multidimensional image, such as a two-dimensional (2D) medical image, a three-dimensional (3D) medical image, and a four-dimensional (4D) medical image. Examples of the medical images include, but are not limited to, images acquired by at least one of a magnetic resonance imaging (MRI) apparatus, a computer tomography (CT) imaging apparatus, an ultrasound imaging apparatus, an optical imaging apparatus, a positron-emission tomography (PET) imaging apparatus, and a single-photon emission computed tomography (SPET) imaging apparatus. An example of the 4D medical images may be four-dimensional computed tomography (4DCT), which is a type of CT scanning which records multiple images over time. It allows playback of the scan as a video, so that physiological processes can be observed and internal movement can be tracked. Another example of the 4D medical images may be fMRI, which measures brain activity by detecting changes associated with blood flow.

In step 120, i.e. step b), feature heatmaps for at least two features of interest are generated by applying a CNN to the at least one medical image. The CNN has been trained for feature identification.

In some examples, the at least two features of interest comprise at least two landmarks, such as points, voxels, contours, volumes, anatomical features, etc. The feature heatmaps comprise landmark heatmaps for the at least two landmarks generated by applying a first CNN to the at least one medical image. The first CNN has been trained for landmark identification. The statistical correlation comprises a spatial correlation between the at least two landmarks as a first probabilistic prior for mutually regularizing the landmark heatmaps. The regularized landmark heatmaps comprise regularized landmark heatmaps.

In some examples, the at least two features of interest comprise at least two temporal events, such as temporal activity of points, voxels, contours, volumes, anatomical features, etc. The landmark heatmaps comprise temporal-event heatmaps for the at least two temporal events generated by applying a second CNN to the at least one medical image. The second CNN has been trained for temporal event identification. The statistical correlation comprises a temporal correlation between at least two temporal events to be detected as a second probabilistic prior for mutually regularizing the temporal event heatmaps. The regularized landmark heatmaps comprise regularized temporal event heatmaps.

In some examples, the same CNNs may be used for landmark and temporal events detection. In other words, the first CNN and the second CNN are the same CNNs. The same CNN may thus be use for identifying spatio-temporal features, such as a multi-dimensional (due to the spatial dimensions) time series in the fMRI signal.

Figure 3A:
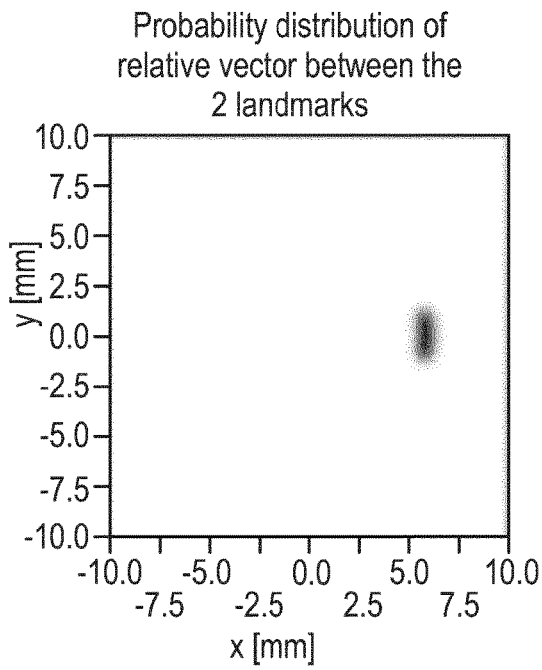
FIG. 3A illustrates anatomical knowledge about the relative vector between the two landmarks.
Figure 3B:
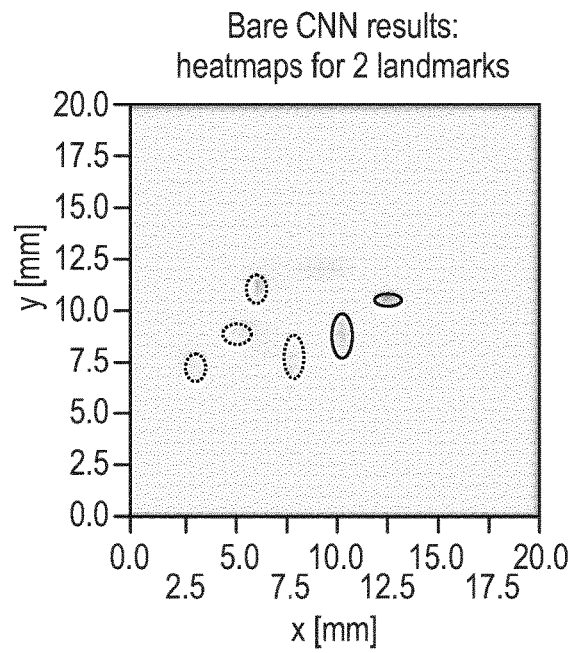
FIG. 3B illustrates bare CNN results for the heatmaps corresponding to the two landmarks.

An example of the feature heatmaps is illustrated in FIG. 3B.

In step 130, i.e. step c), a correlation between the at least two features of interest is used as a probabilistic prior for mutually regularizing the feature heatmaps. The statistical correlation is estimated based on annotated medical image data, which may be obtained from an annotated medical image database.

For illustrative purposes, an exemplary implementation and usage of the statistical correlation as a probabilistic prior for the case of two landmarks $x_1$ and $x_2$ is illustrated in FIGS. 3A to 3D. The regularization may be implemented in the following steps:

Firstly, the spatial correlation between the at least two landmarks $x_1$ and $x_2$ may be estimated in terms of a conditional probability for detecting one landmark at a certain spatial position given that another landmark has been detected at some spatial position. For example, the probability density of the relative vector between the landmarks $x_2$ and $x_1$ may be estimated by:

$$p_{2\text{-}1}^{rel}(x_2-x_1)$$

from annotated training data by e.g. a kernel density estimation approach and take care that the weight of rare events is sufficiently high such that anomalies can be accurately described. For example, FIG. 3A illustrates anatomical knowledge about the relative vector between the two landmarks $x_1$ and $x_2$ (assumed to have an expected distance of about 5.5 mm and a narrow orientation distribution in this case).

Secondly, the first probabilistic prior for one landmark may be estimated by convolving the conditional probability of the said one landmark at the certain spatial position and a heatmap result of another landmark indicative of a pseudo-probability for an occurrence of the said another landmark at one or more spatial positions.

For example, the bare CNN output $q_1$ and $q_2$ may be convolved with the previously obtained conditional probabilities:

$$q_{1|2}^{prior}(x_1)=(p_{2\text{-}1}^{rel}*q_2)(x_1)$$

$$q_{2|1}^{prior}(x_2)=(p_{1\text{-}2}^{rel}*q_1)(x_2)$$

where * denotes the convolution, and $$p_{1\text{-}2}^{rel}(r)=p_{2\text{-}1}^{rel}(-r)$$

Figure 3C:
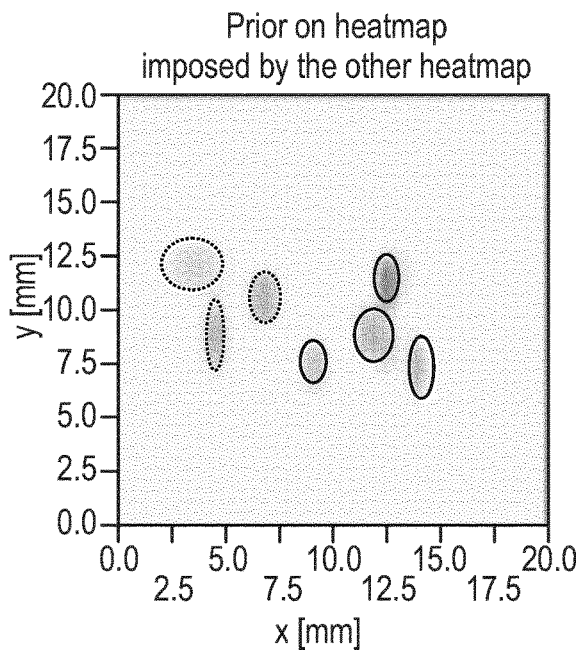
FIG. 3C illustrates mutual prior on the heatmaps imposed by the respective other one.

For example, FIG. 3B illustrates bare CNN results for the heatmaps corresponding to the two landmarks, i.e. bare CNN output $q_1$ and $q_2$. The heatmaps for the two landmarks are depicted with a solid contour line and a dotted contour line, respectively. FIG. 3C illustrates mutual prior on the heatmaps imposed by the respective other one. The heatmaps for the two landmarks are depicted with a solid contour line and a dotted contour line, respectively.

Finally, the probabilistic prior is used for mutually regularizing the landmark heatmaps.

For example, it is possible to use the following scheme to regularize the CNN results:

$$q_1^{reg}(x_1)=(1-\lambda)q_1(x_1)+\lambda q_{1|2}^{prior}(x_1)q_1(x_1)$$

$$q_2^{reg}(x_2)=(1-\lambda)q_2(x_2)+\lambda q_{2|1}^{prior}(x_2)q_2(x_2)$$

where $\lambda$ denotes a tunable regularization parameter, lying between 0 and 1. In this way, this probabilistic regularization scheme can be integrated into all existing CNN architectures by appending convolutional layers as described above. This may enable two variants of applying the regularization layers: either only at test-time (i.e. as a post-processing step) and already during training of the CNN in order to stabilize the prediction by learning correlation-related features.

Figure 3D:
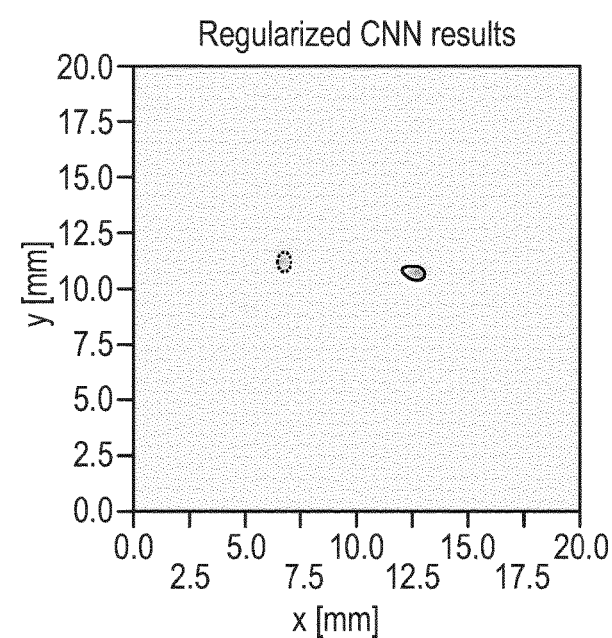
FIG. 3D illustrates regularized CNN results by multiplication of the bare CNN heatmaps with the respective prior.

For example, FIG. 3D illustrates regularized CNN results by multiplication of the bare CNN heatmaps with the respective prior. The regularized CNN results for the two landmarks are depicted with a solid contour line and a dotted contour line, respectively.

Optionally, in order to impose mutual priors for detecting more than two landmarks, this regularization may be based on approximating the spatial correlations between the i-th landmark and N other ones, namely the $j_1$-th, ..., $j_N$-th landmark (e.g. its N anatomically nearest neighbours), by a decomposition into binary correlations:

$$p_{i|j_1\ldots j_N}(x_i|x_{j_1},\ldots,x_{j_N})\approx p_{i|j_1}(x_i|x_{j_1})\ldots p_{i|j_N}(x_i|x_{j_N})$$

where each factor on the right-hand-side coincides with the probability density of the corresponding relative coordinate, as explicated above. Thereby, the proposed method avoids the curse of dimensionality when estimating and evaluating these correlations. This results into the following prior for the heatmap of the i-th landmark being induced by the heatmaps for the $j_1$-th, ..., $j_N$-th landmark $$q_{i|j_1\ldots j_N}^{prior}(x_i)=q_{i|j_1}^{prior}(x_i)\ldots q_{i|j_N}^{prior}(x_i)$$

such that the calculation of this prior can be formulated as additional convolutional layers of a given CNN. This prior can be used in various ways to regularize the CNN results, e.g. as a convex sum with the bare CNN result for the i-th landmark, $q_i$, as described above, either for post-processing or during training. Moreover, by regularizing $q_i$ with multiple groups of other landmarks (and appropriate regularization weights) more or less rigid spatial correlations can be incorporated into the CNN. The more other landmarks are involved in the mutual prior, the more restrictive becomes this prior.

In step 140, i.e. step d), the at least two features of interest in the at least one medical image are identified based on the regularized feature heatmaps.

It will be appreciated that the above operation may be performed in any suitable order, e.g., consecutively, simultaneously, or a combination thereof, subject to, where applicable, a particular order being necessitated, e.g., by input/output relations.

The above discussion may also be applied to the detection of temporal events. In other words, a similar regularization scheme may be applied to temporal events. In the case of temporal event detection, the temporal correlation between the at least two temporal events may be estimated in terms of a conditional probability for detecting one temporal event at a certain temporal position given that another temporal event has been detected at some temporal position. Optionally, the temporal correlation between one temporal event and more than two other temporal events may be estimated in terms of a product of conditional probabilities, each for detecting the said one temporal event at a certain temporal position given that one of the more than two other temporal events has been detected at some temporal position. Optionally, the second probabilistic prior for one temporal event may be estimated by convolving the conditional probability of the said one temporal event at the certain temporal position and a heatmap result of another temporal event indicative of a pseudo-probability for an occurrence of the said another temporal event at one or more temporal positions.

Figure 4:
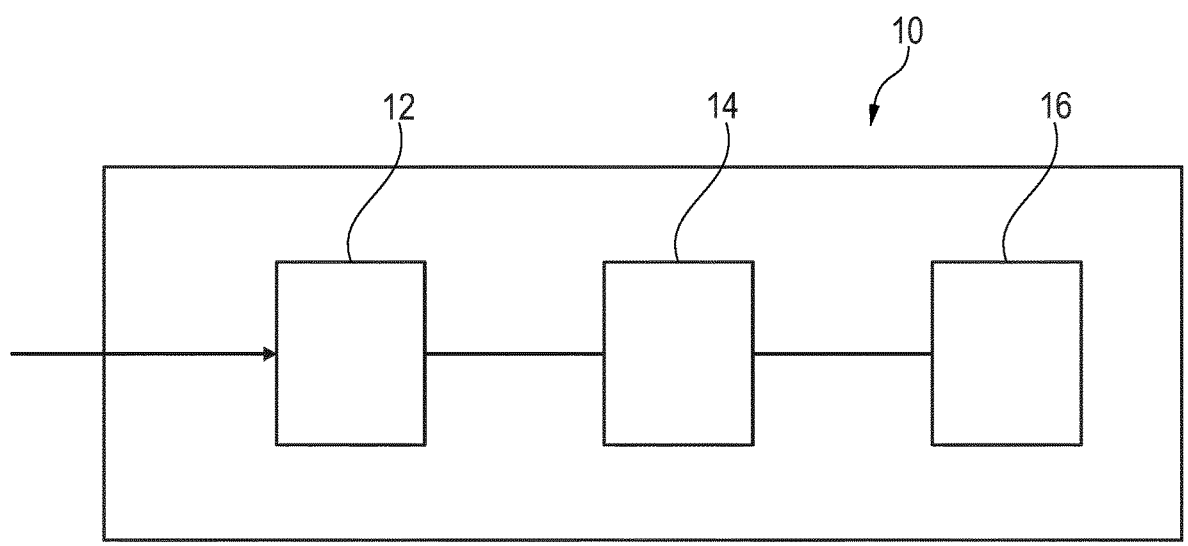
FIG. 4 illustrates an apparatus for feature identification in medical images according to some embodiments of the present disclosure.

FIG. 4 illustrates an apparatus 10 for feature identification in medical images according to some embodiments of the present disclosure. The apparatus 10 comprises an input unit 12 and a processing unit 14.

The input unit 10 is configured for receiving at least one medical image of an object. The at least one medical image comprises a multidimensional image, such as a two-dimensional medical image, a three-dimensional medical image, or a four-dimensional medical image. For example, the input unit may be a communication interface that communicates with a medical imaging apparatus, e.g., MRI, or PACS with a wireless or wired connection to obtain one or more medical images.

The processing unit 14 is configured for generating feature heatmaps for at least two features of interest by applying a CNN to the at least one medical image. The CNN has been trained for feature identification.

In some examples, the at least two features of interest may comprise at least two landmarks. The feature heatmaps may comprise landmark heatmaps for the at least two landmarks generated by applying a first CNN to the at least one medical image. The first CNN has been trained for landmark identification. The statistical correlation may comprise a spatial correlation between the at least two landmarks as a first probabilistic prior for mutually regularizing the landmark heatmaps. The regularized landmark heatmaps may comprise regularized landmark heatmaps.

In some examples, the at least two features of interest may comprise at least two temporal events. The landmark heatmaps may comprise temporal-event heatmaps for the at least two temporal events generated by applying a second CNN to the at least one medical image. The second CNN has been trained for temporal event identification. The statistical correlation may comprise a temporal correlation between at least two temporal events as a second probabilistic prior for mutually regularizing the temporal event heatmaps. The regularized landmark heatmaps may comprise regularized temporal event heatmaps.

The processing unit 14 is further configured for using a correlation between the at least two features of interest as a probabilistic prior for mutually regularizing the feature heatmaps. The statistical correlation is estimated based on annotated medical image data, e.g. training data.

For landmark detection, the processing unit may be configured for estimating the spatial correlation between the at least two landmarks in terms of a conditional probability for detecting one landmark at a certain spatial position given that another landmark has been detected at some spatial position. Optionally, the processing unit may be configured for estimating the spatial correlation between one landmark and more than two other landmarks in terms of a product of conditional probabilities, each for detecting the said one landmark at a certain spatial position given that one of the more than two other landmarks has been detected at some spatial position. Optionally, the processing unit may be configured for estimating the first probabilistic prior for one landmark by convolving the conditional probability of the said one landmark at the certain spatial position and a heatmap result of another landmark indicative of a pseudo-probability for an occurrence of the said another landmark at one or more spatial positions.

For temporal event detection, the processing unit 14 may be configured for estimating the temporal correlation between the at least two temporal events in terms of a conditional probability for detecting one temporal event at a certain temporal position given that another temporal event has been detected at some temporal position. Optionally, the processing unit 14 may be configured for estimating the temporal correlation between one temporal event and more than two other temporal events in terms of a product of conditional probabilities, each for detecting the said one temporal event at a certain temporal position given that one of the more than two other temporal events has been detected at some temporal position. Optionally, the processing unit 14 may be configured to estimate the second probabilistic prior for one temporal event by convolving the conditional probability of the said one temporal event at the certain temporal position and a heatmap result of another temporal event indicative of a pseudo-probability for an occurrence of the said another temporal event at one or more temporal positions.

Optionally, the processing unit 14 may be configured for determining the statistical correlation from training data based on a kernel density estimation approach for the relative vector between any pair of two features of interest.

Optionally, a calculation of the probabilistic prior may be formulated as an additional convolutional layer of the CNN. This allows to integrate the probabilistic regularization scheme into all existing CNN architectures by appending convolutional layers.

Optionally, the probabilistic prior is used to mutually regularizing the feature heatmaps in at least one of the following manners: applying a regularization layer at test-time during a post-processing step, and applying a regularization layer during training of the CNN.

The processing unit 14 is further configured for identifying the at least two features of interest in the at least one medical image based on the regularized feature heatmaps.

The apparatus also comprises an output unit 16, such as a communication interface, for outputting the results to e.g., a display.

Figure 5:
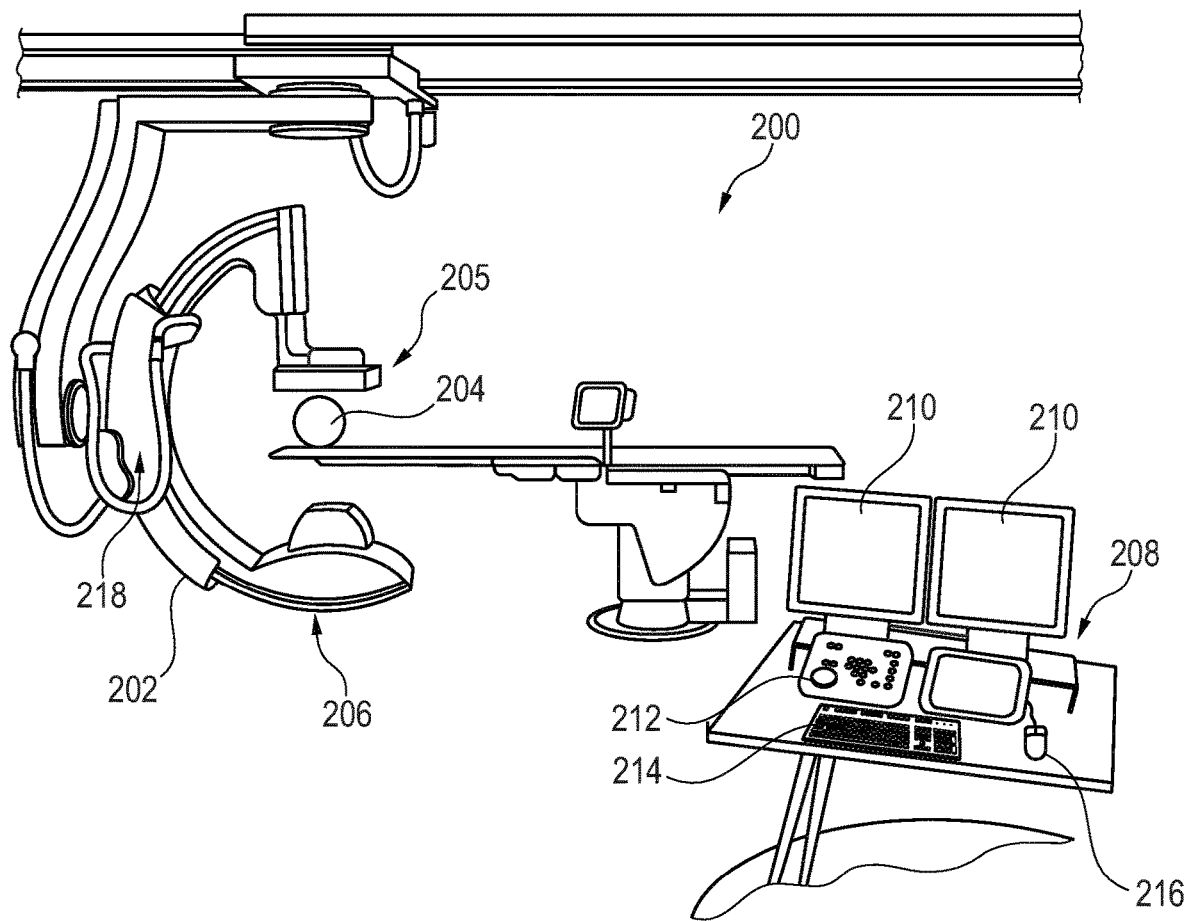
FIG. 5 shows a medical imaging system according to some embodiments of the present disclosure.

FIG. 5 shows a medical imaging system 200 according to some embodiments of the present disclosure in a C-arm X-ray imaging suite. Other examples of the medical imaging system may include, but not limited to, an MRI system, an ultrasound imaging system, an optical imaging system, a PET imaging system, and a SPECT imaging system.

The C-arm imaging system 200 has a support arrangement 202 which may translate through azimuth and elevation axes around the object of interest 204. For example, the C-arm X-ray imaging system 200 may be supported from the ceiling of an X-ray facility. The support arrangement holds a rotary anode X-ray source 205 and an X-ray detector 206.

The C-arm imaging system (or CT imaging system) is optionally provided with motion sensors (for example, rotary encoders in the C-arm or CT gantry axes). This enables the feedback of motion information to the X-ray imaging system state detector. Alternatively, or in combination, the X-ray imaging system state detector is configured to receive a list of motion commands representing a pre-planned imaging protocol.

The C-arm X-ray imaging system is controlled, for example, from a control console 208, comprising, for example, display screens 210, computer apparatus 212 optionally functioning as a stator control system, controllable via a keyboard 214 and a mouse 216.

The C-arm 218 is configured to translate around the object of interest 204, not simply in a flat rotational sense (in the sense of a CT scanner), but also by tilting.

The apparatus 10 described above may be embodied as the computer apparatus 212 for feature detection.

In operation, an object of interest 204 is placed in between the detector 206 and the X-ray source 205 of a C-arm imaging system 200. The C-arm may rotate about the patient for acquisition of an image data set which is then used for 3D image reconstruction. The apparatus 10, which is embodied as the computer apparatus 212, is configured for identifying the at least two landmarks of interest in the image data set.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for feature identification in medical images, comprising;
a memory that stores a plurality of instructions; and
processor circuitry that couples to the memory and is configured to execute the plurality of instructions to:
receive at least one medical image of an object, wherein the at least one medical image comprises a multidimensional image;
generate feature heatmaps for at least two features of interest by applying a convolutional neural network (CNN) to the at least one medical image, wherein the CNN has been trained for feature identification;
use a statistical correlation between the at least two features of interest as a probabilistic prior for mutually regularizing the feature heatmaps, wherein the statistical correlation is estimated based on annotated medical image data;
identify the at least two features of interest in the at least one medical image based on the regularized feature heatmaps; and
output a result of the feature identification.

2. The apparatus according to claim 1,
wherein the at least two features of interest comprise at least two landmarks;
wherein the feature heatmaps comprise landmark heatmaps for the at least two landmarks generated by applying a first CNN to the at least one medical image, wherein the first CNN has been trained for landmark identification;
wherein the statistical correlation comprises a spatial correlation between the at least two landmarks as a first probabilistic prior for mutually regularizing the landmark heatmaps; and
wherein the regularized landmark heatmaps comprise regularized landmark heatmaps.

3. The apparatus according to claim 2, further comprising estimating the spatial correlation between the at least two landmarks in terms of a conditional probability for detecting one landmark at a certain spatial position given that another landmark has been detected at some spatial position.

4. The apparatus according to claim 2, further comprising estimating the spatial correlation between one landmark and more than two other landmarks in terms of a product of conditional probabilities, each for detecting the said one landmark at a certain spatial position given that one of the more than two other landmarks has been detected at some spatial position.

5. The apparatus according to claim 2, further comprising estimating the first probabilistic prior for one landmark by convolving the conditional probability of the one landmark at the certain spatial position and a heatmap result of another landmark indicative of a pseudo-probability for an occurrence of the another landmark at one or more spatial positions.

6. The apparatus according to claim 1,
wherein the at least two features of interest comprise at least two temporal events;
wherein the landmark heatmaps comprise temporal-event heatmaps for the at least two temporal events generated by applying a second CNN to the at least one medical image, wherein the second CNN has been trained for temporal event identification;
wherein the statistical correlation comprises a temporal correlation between at least two temporal events to be detected as a second probabilistic prior for mutually regularizing the temporal event heatmaps; and
wherein the regularized landmark heatmaps comprise regularized temporal event heatmaps.

7. The apparatus according to claim 6, further comprising estimating the temporal correlation between the at least two temporal events in terms of a conditional probability for detecting one temporal event at a certain temporal position given that another temporal event has been detected at some temporal position.

8. The apparatus according to claim 6, further comprising estimating the temporal correlation between one temporal event and more than two other temporal events in terms of a product of conditional probabilities, each for detecting the one temporal event at a certain temporal position given that one of the more than two other temporal events has been detected at some temporal position.

9. The apparatus according to claim 6, further comprising estimating the second probabilistic prior for one temporal event by convolving the conditional probability of the said one temporal event at the certain temporal position and a heatmap result of another temporal event indicative of a pseudo-probability for an occurrence of the said another temporal event at one or more temporal positions.

10. The apparatus according to claim 1, further comprising determining the statistical correlation from training data based on a kernel density estimation approach for the relative vector between any pair of two features of interest.

11. The apparatus according to claim 1, wherein a calculation of the probabilistic prior is formulated as an additional convolutional layer of the CNN.

12. The apparatus according to claim 1, wherein the probabilistic prior is used to mutually regularize the feature heatmaps in at least one of the following manners:
applying a regularization layer at test-time during a post-processing step; and
applying a regularization layer during training of the CNN.

13. A method for feature identification in medical images, comprising:
receiving at least one medical image of an object, wherein the at least one medical image comprises a multidimensional image;
generating feature heatmaps for at least two features of interest by applying a convolutional neural network (CNN) to the at least one medical image, wherein the CNN has been trained for feature identification;
using a correlation between the at least two features of interest as a probabilistic prior for mutually regularizing the feature heatmaps, wherein the statistical correlation is estimated based on annotated medical image data; and
identifying the at least two features of interest in the at least one medical image based on the regularized feature heatmaps.

14. A non-transitory computer-readable medium for storing executable instructions, which cause a method to be performed for feature identification in medical images, the method comprising:
receiving at least one medical image of an object, wherein the at least one medical image comprises a multidimensional image;
generating feature heatmaps for at least two features of interest by applying a convolutional neural network (CNN) to the at least one medical image, wherein the CNN has been trained for feature identification;
using a correlation between the at least two features of interest as a probabilistic prior for mutually regularizing the feature heatmaps, wherein the statistical correlation is estimated based on annotated medical image data; and
identifying the at least two features of interest in the at least one medical image based on the regularized feature heatmaps.

* * * * *